(12) United States Patent
Venkatesh et al.

(10) Patent No.: US 11,928,079 B1
(45) Date of Patent: Mar. 12, 2024

(54) INTELLIGENTLY ASSOCIATING A FILE WITH AN APPLICATION

(71) Applicant: Dell Products L.P., Round Rock, TX (US)

(72) Inventors: Ramanujam Kaniyar Venkatesh, Bangalore (IN); Jyothi Bandakka, Bengaluru (IN); Sudhakar Ramasamy, Salem (IN); Sharik Saigal, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/049,520

(22) Filed: Oct. 25, 2022

(51) Int. Cl.
*G06F 16/16* (2019.01)

(52) U.S. Cl.
CPC .................................. *G06F 16/16* (2019.01)

(58) Field of Classification Search
CPC ....................................................... G06F 16/16
USPC ......................................................... 707/822
See application file for complete search history.

(56) References Cited

U.S. PATENT DOCUMENTS

| | | | |
|---|---|---|---|
| 7,409,405 B1* | 8/2008 | Masinter | G06F 9/445 707/999.102 |
| 8,990,697 B2* | 3/2015 | Patel | G06F 3/048 715/740 |
| 2016/0085765 A1* | 3/2016 | Verma | G06F 16/182 707/827 |
| 2016/0191627 A1* | 6/2016 | Huang | H04L 67/565 709/205 |
| 2018/0146029 A1* | 5/2018 | Newman | G06F 21/629 |
| 2018/0173575 A1* | 6/2018 | Leibovici | G06F 16/16 |
| 2019/0050420 A1* | 2/2019 | Miranda-Steiner | G06F 16/178 |
| 2019/0251188 A1* | 8/2019 | Luo | G06F 16/116 |
| 2019/0260836 A1* | 8/2019 | Zahl | H04L 63/102 |
| 2021/0326143 A1* | 10/2021 | Qiao | G06F 9/44505 |
| 2021/0374100 A1* | 12/2021 | Liu | G06F 9/452 |
| 2022/0113987 A1* | 4/2022 | Parry-Barwick | G06F 21/51 |

* cited by examiner

*Primary Examiner* — Hicham Skhoun
(74) *Attorney, Agent, or Firm* — Kirton McConkie; Brian Tucker

(57) ABSTRACT

A file can be intelligently associated with an application. When a user attempts to open a file on a user computing device, context for the file can be collected and provided to an intelligent file association engine. The intelligent file association engine can use the context to select an application to be used to open the file from among different applications. These different applications can include a local application, a VDI application, and a cloud application.

17 Claims, 10 Drawing Sheets

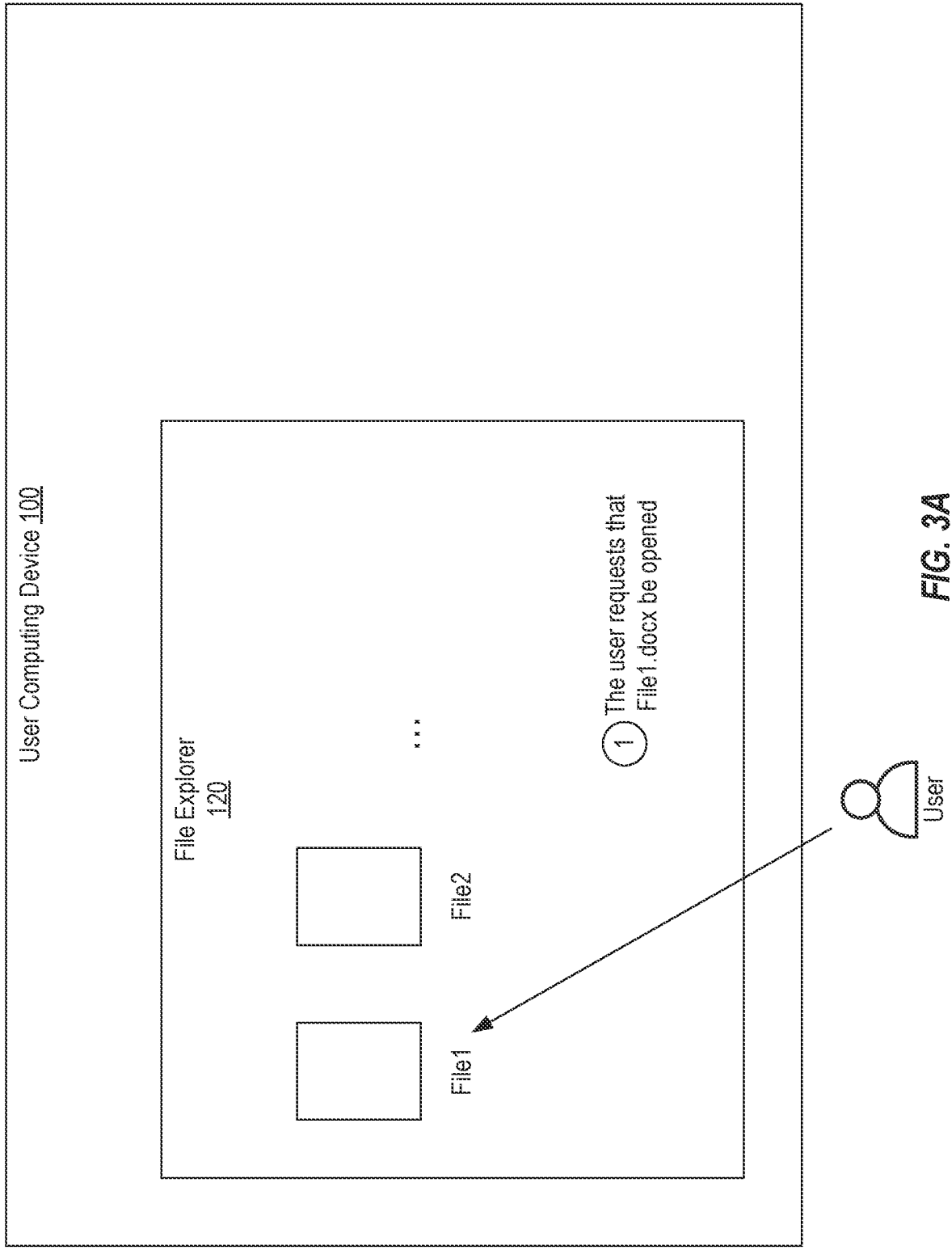

INTELLIGENTLY ASSOCIATING A FILE WITH AN APPLICATION

CROSS-REFERENCE TO RELATED APPLICATIONS

N/A

BACKGROUND

In the context of this application, a modern workspace refers to a hybrid environment provided on a user computing device in which the user can seamlessly access applications and data available across public and/or private clouds and locally. For example, a modern workspace may allow a user to seamlessly access applications of a variety of cloud solutions (e.g., Microsoft 365, Google Workspace, etc.) (or "cloud applications"), applications that are made available via a virtual desktop infrastructure (or "VDI applications"), and local applications. Similarly, the files that the user may access via these applications could be stored locally (e.g., on a storage device or on a network share) or in the cloud (e.g., on OneDrive or Google Drive).

Some modern workspaces, such as the Dell Hybrid Client, allow the selection of a mode for controlling which type of applications will be available. For example, when a cloud mode, local mode, or VDI mode is selected, the modern workspace will make cloud applications, local applications, or VDI applications respectively available to the user. Combination modes could also be selected. For example, when cloud and local mode is selected, cloud and local applications will be made available to the user.

Depending on the selected mode, a user may have the option of manually selecting an application type to open a file. For example, when cloud mode is selected, the user may not have an option because the appropriate cloud application alone will be available to open a file (e.g., opening a .docx file in Word for Microsoft 365). In contrast, when cloud, local and VDI mode is selected, the user may have the option of opening a file in the appropriate cloud application, the appropriate local application, or the appropriate VDI application (e.g., opening a .docx file in Word for Microsoft 365, a local installation of Word, or an instance of Word accessible via a VDI).

This manual selection of file type associations creates various difficulties due to the hybrid environment of a modern workspace. For example, when the user attempts to open a file, the file will be opened based on the file type association without any consideration of where the file or application is located, network latency or other network parameters, or resources of the user computing device. Because of this lack of consideration, the performance of a modern workspace is oftentimes diminished.

BRIEF SUMMARY

The present invention extends to systems, methods and computer program products for intelligently associating a file with an application. When a user attempts to open a file on a user computing device, context for the file can be collected and provided to an intelligent file association engine. The intelligent file association engine can use the context to select an application to be used to open the file from among different applications. These different applications can include a local application, a VDI application, and a cloud application.

In some embodiments, the present invention may be implemented as a method for intelligently associating a file with an application. An intelligent file association engine can receive context for a file that can be opened in multiple different applications on a user computing device. The multiple different applications can include a local application, a virtual desktop infrastructure (VDI) application, and/or a cloud application. Based on the context, a first application of the multiple different application can be selected. The file can then be opened in the first application.

In some embodiments, the present invention can be implemented as computer storage media storing computer executable instructions which when executed implement a method for intelligently associating a file with an application. An attempt to open a file on a user computing device can be detected. Context for the file can be obtained. The context for the file can be provided to an intelligent file association engine to request a selection of an application to be used to open the file. The file can then be opened using the application.

In some embodiments, the present invention may be implemented as a system for intelligently associating a file with an application. The system may include one or more user computing devices each having an intelligent file association agent and an intelligent file association engine. The intelligent file association engine can be configured to receive, from the intelligent file association agent on each of the one or more user computing devices, context for a file that can be opened in multiple different applications on the respective user computing device. The multiple different applications can include a local application, a virtual desktop infrastructure (VDI) application, and/or a cloud application. Based on the context, the intelligent file association engine can select a first application of the multiple different application. The intelligent file association engine can then notify the intelligent file association agent on the respective user computing device of the selection of the first application. The intelligent file association agent can be configured to cause the file to be opened in the first application.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 3A-3E provide an example of how a file may be intelligently associated with an application in accordance with one or more embodiments of the present invention;

DETAILED DESCRIPTION

Figure 1:
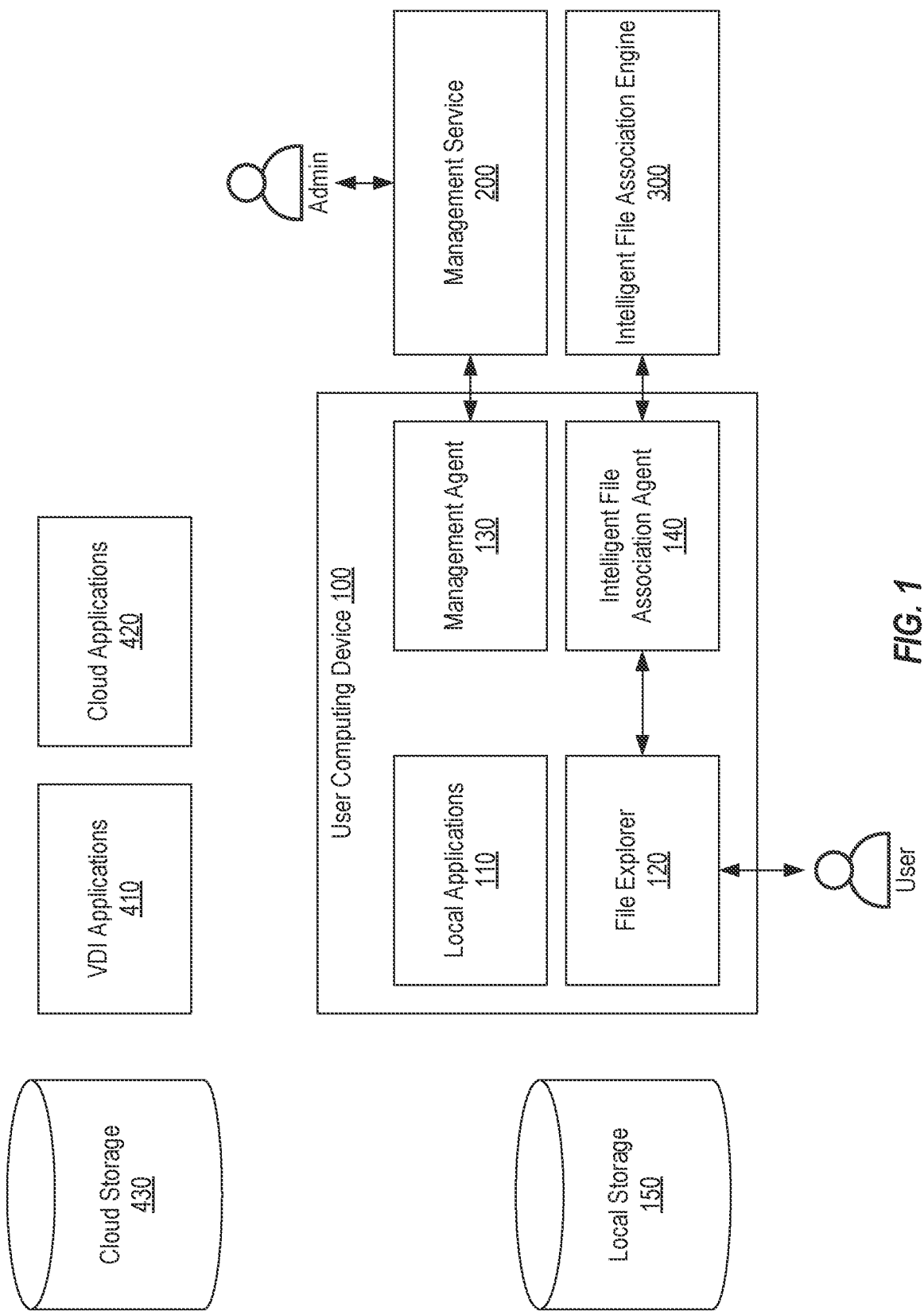
FIG. 1 provides an example of a computing environment in which embodiments of the present invention may be implemented.

FIG. 1 provides an example of a computing environment in which embodiments of the present invention may be implemented. This computing environment includes at least one user computing device 100 that includes or has access to local storage 150, a management server 200, an intelligent file association engine 300, VDI applications 410, cloud applications 420, and cloud storage 430.

User computing device 100 includes local applications 110, file explorer 120, a management agent 130, and an intelligent file association agent 140. Local applications 110 represent any application that is installed on user computing device 100. File explorer 120 can represent a component of a modern workspace that allows a user to explore files available in the modern workspace. These files can include those stored locally in local storage 150 (e.g., on a local or network drive) and those stored in cloud storage 430. Management agent 130 can interface with management service 200 to allow an administrator to configure user computing device 100 including any modern workspace deployed on user computing device 100. Intelligent file association agent 140 can interface with intelligent file association engine 300 to intelligently associate a file with an application in accordance with embodiments of the present invention.

As an overview, when a user attempts to open a file in a modern workspace on user computing device 100 (e.g., via file explorer 120), intelligent file association agent 140 can provide information about the file to be opened along with other context to intelligent file association engine 300. Intelligent file association engine 300 can use such context to intelligently select a type of application to be used to open the file (e.g., a local application, a cloud application, or a VDI application). Intelligent file association engine 300 can notify intelligent file association agent 140 of the selected type of application and in turn can instruct file explorer 120 to cause the file to be opened with the selected type of application.

Figure 2:
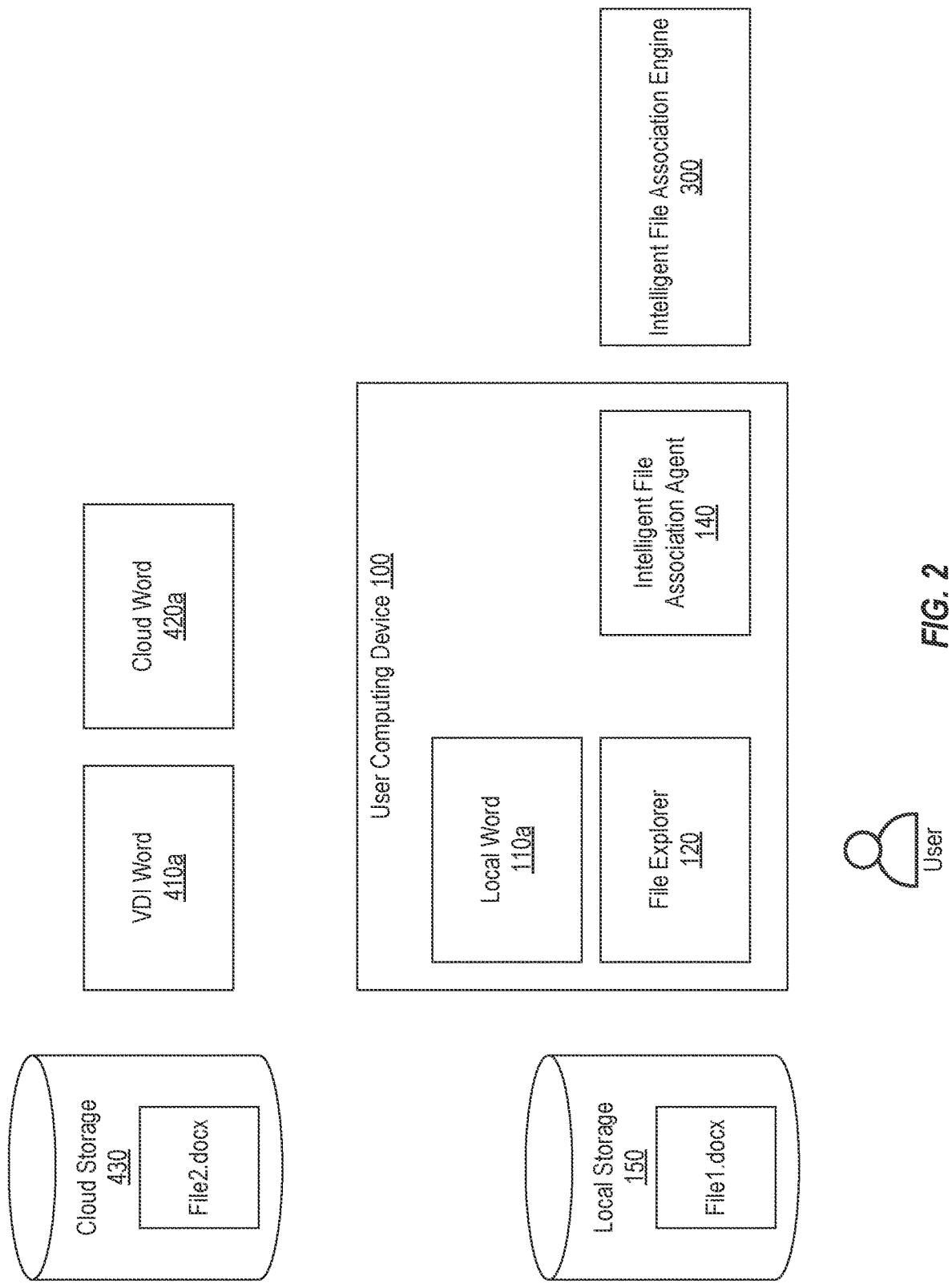
FIG. 2 provides another example of a computing environment in which embodiments of the present invention may be implemented.

FIG. 2 represents an example scenario that will be used to describe embodiments of the present invention. In this example scenario, the user could have access to three different versions of Microsoft Word: a local Word 110a installed on user computing device 100, a VDI Word 410a that can be accessed via a VDI (e.g., Citrix, VMware, etc.), and a cloud Word 420a that is hosted in the cloud (e.g., as part of Microsoft 365). In this example scenario, it is also assumed that a file, file1.docx, is stored in local storage 150 and a file, file2.docx, is stored in cloud storage 430.

Figure 3B:
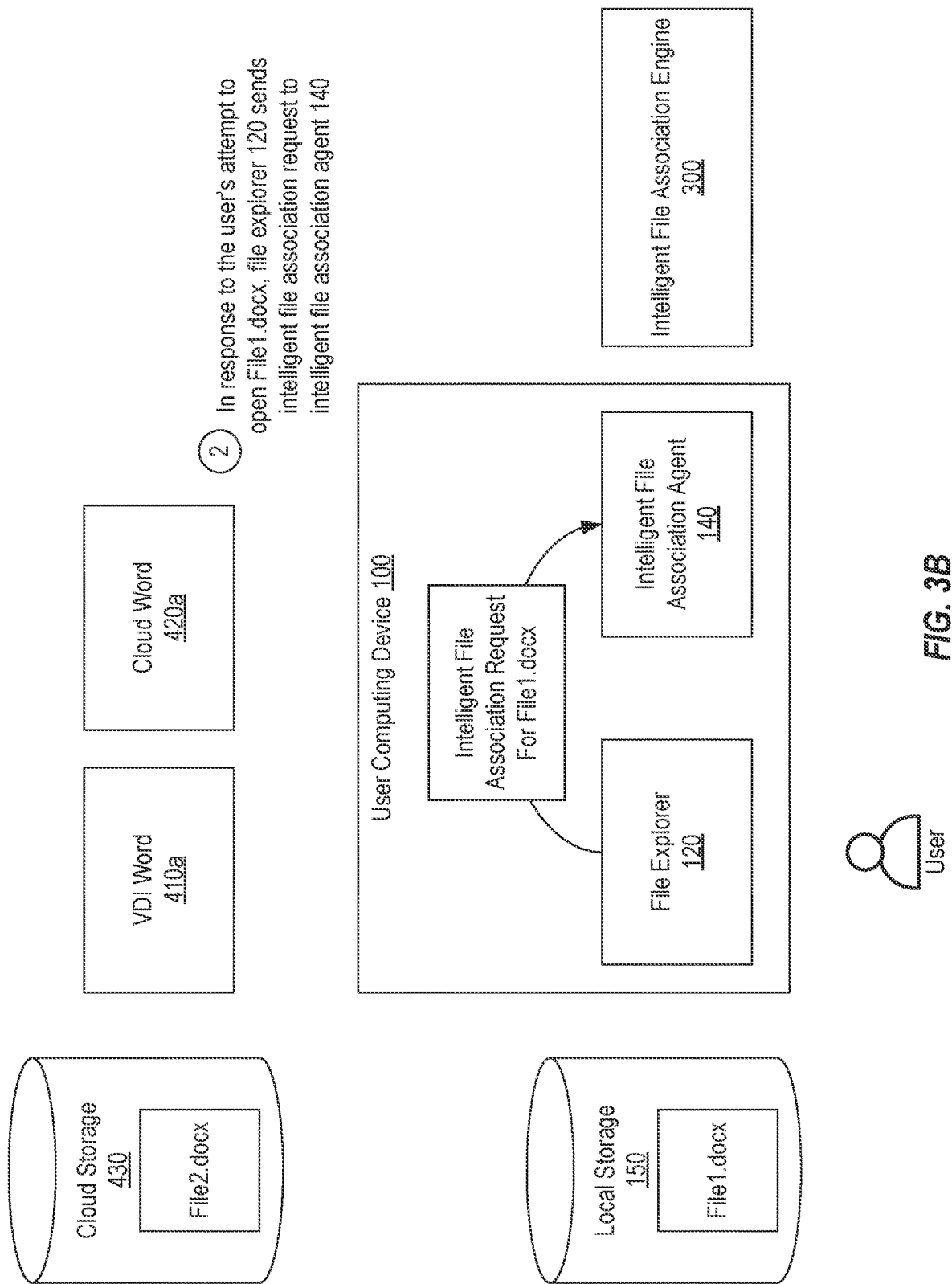

FIGS. 3A-3E, which are based on FIG. 2, provide a first example of how a file can be intelligently associated with an application in accordance with embodiments of the present invention. Turning to FIG. 3A, in step 1, it is assumed that the user of user computing device 100 requests that File1.docx be opened. For example, the user could open file explorer 120 and select an icon representing File1.docx. The user could also employ other techniques for attempting to open File1.docx. Step 1 could also represent a user's attempt to create a new file.

Turning to FIG. 3B, in step 2 and in response to the user's attempt to open File1.docx, file explorer 120 can send an intelligent file association request for File1.docx to intelligent file association agent 140. Such intelligent file association requests can identify the file to be opened (or created) and may include some context for the file such as a storage location (e.g., a path to local storage 150 or a URL where the file is available in cloud storage 430) or a size of the file.

Figure 3C:
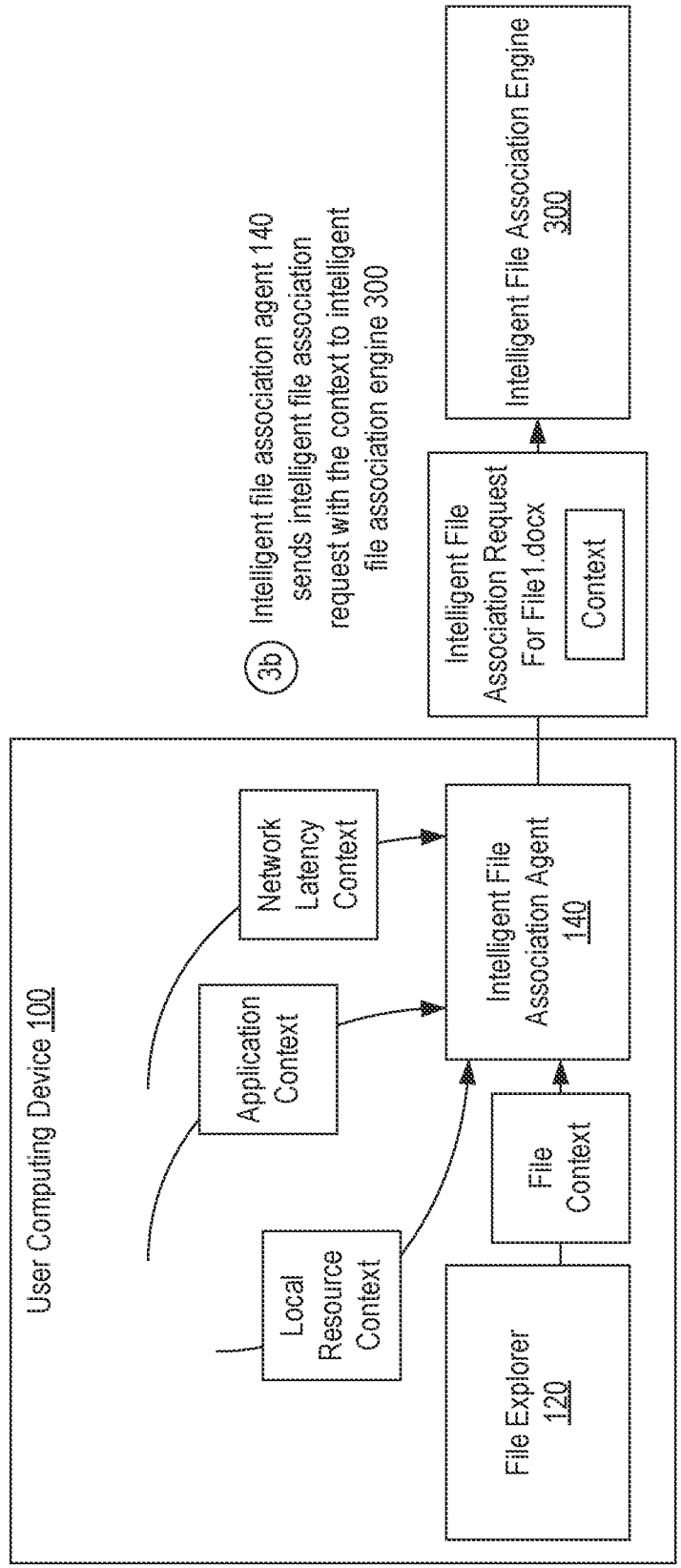

Turning to FIG. 3C, in step 3a, intelligent file association agent 140 can gather context available on user computing device 100 for the request to open File1.docx. This context could include file context such as the storage location of the file and its file size (if not previously provided by file explorer 120), local resource context such as hardware resources (e.g., CPU, GPU, memory, storage, etc.) that are available on user computing device 100 and current consumption of such resources, application context such as which application types (e.g., local Word 110a, VDI Word 410a, and/or cloud Word 420a) are currently available on/to user computing device 100, and network latency context such as the network latency for accessing VDI applications 410, the network latency for accessing cloud applications 420, and the network latency for accessing cloud storage 430. In step 3b, intelligent file association agent 140 can send the/an intelligent file association request with the context to intelligent file association engine 300 to thereby request an intelligently selected application to be associated with File1.docx.

Figure 3D:
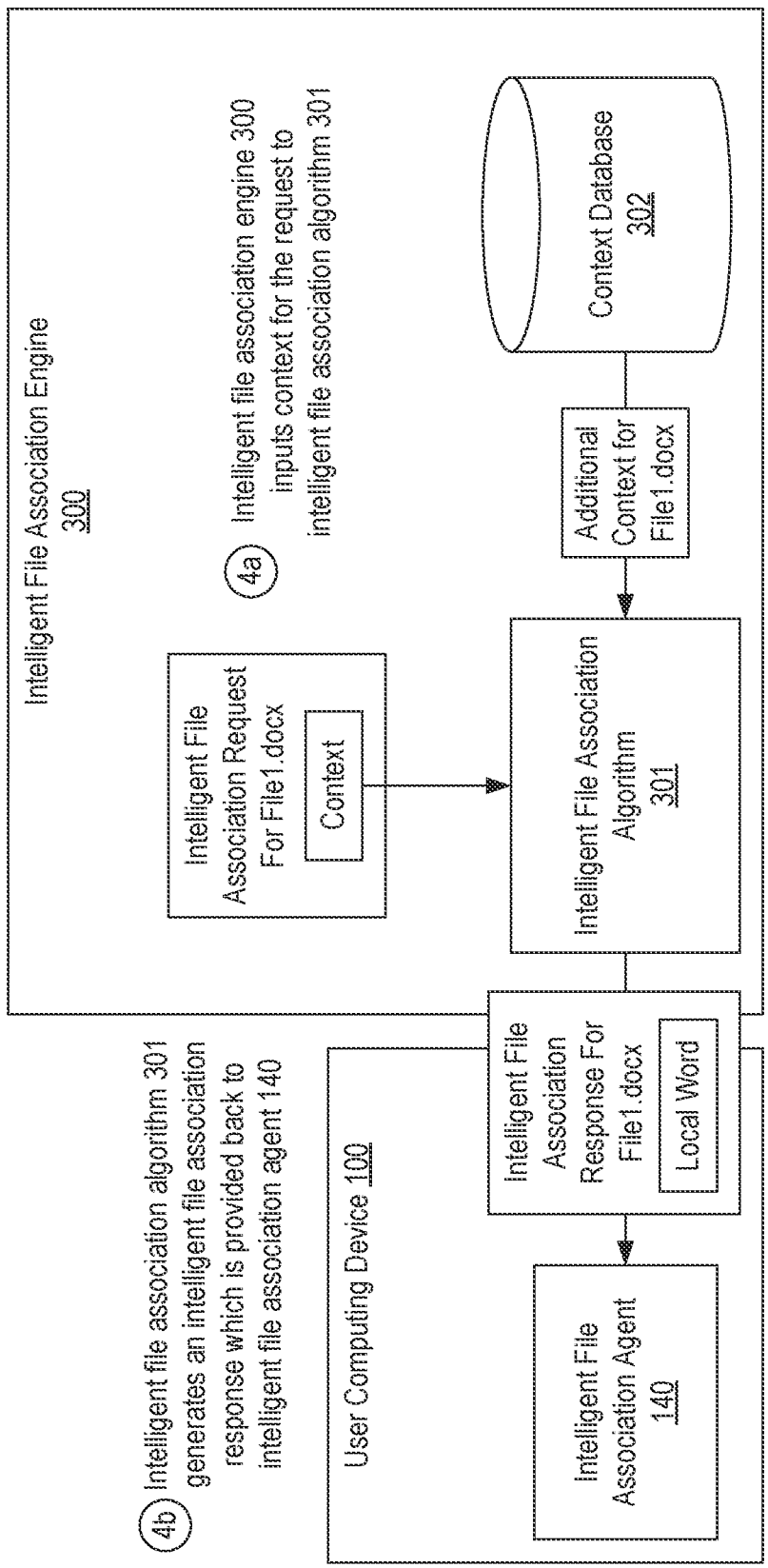

Turning to FIG. 3D, in step 4a and in response to receiving the intelligent file association request from intelligent file association agent 140, intelligent file association engine 300 can input the context provided in the intelligent file association request and possibly additional context for File1.docx obtained from a context database 302 to an intelligent file association algorithm 301. This additional context could include a cost of cloud storage 430 or storage used by VDI applications 410 (e.g., a cost per MB), one or more policies applicable to user computing device 100 or the user, or other general context. In step 4b, intelligent file association algorithm 301 can generate an intelligent file association response for File1.docx based on the provided context and the intelligent file association response can be provided back to intelligent file association agent 140. In this example, it is assumed that intelligent file association algorithm 301 selects local Word 110a to be associated with File1.docx based on the provided context.

Figure 3E:
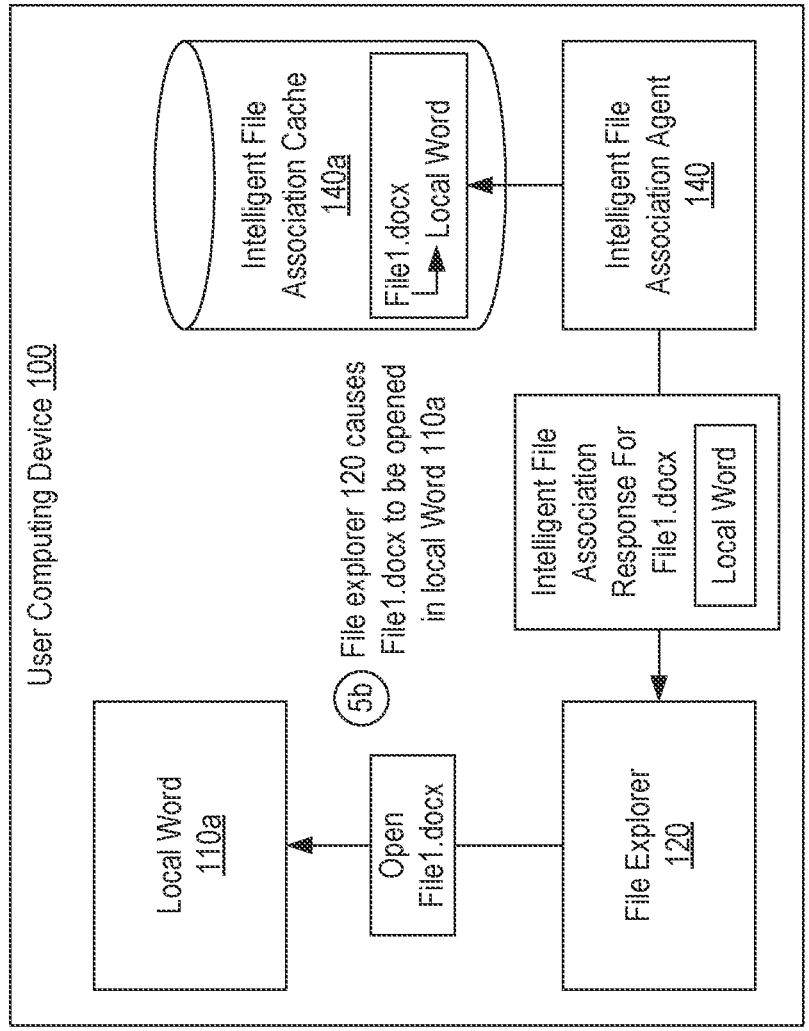

Turning to FIG. 3E, in step 5a, intelligent file association agent 140 can provide the intelligent file association response for File1.docx to file explorer 120 to thereby inform file explorer 120 that local Word 110a should be used to open File1.docx. Then, in step 5b, file explorer 120 can cause File1.docx to be opened in local Word 110a as opposed to in VDI word 410a or cloud Word 420a. In step 5c, intelligent file association agent 140 could cache the intelligent file association for File1.docx in an intelligent file association cache 140a so that intelligent file association agent 140 can provide future intelligent file association responses for File1.docx without interfacing with intelligent file association engine 300. In some embodiments, intelligent file association agent 140 may retain a cached intelligent file association until the context used to select the intelligent file association changes.

Figure 4:
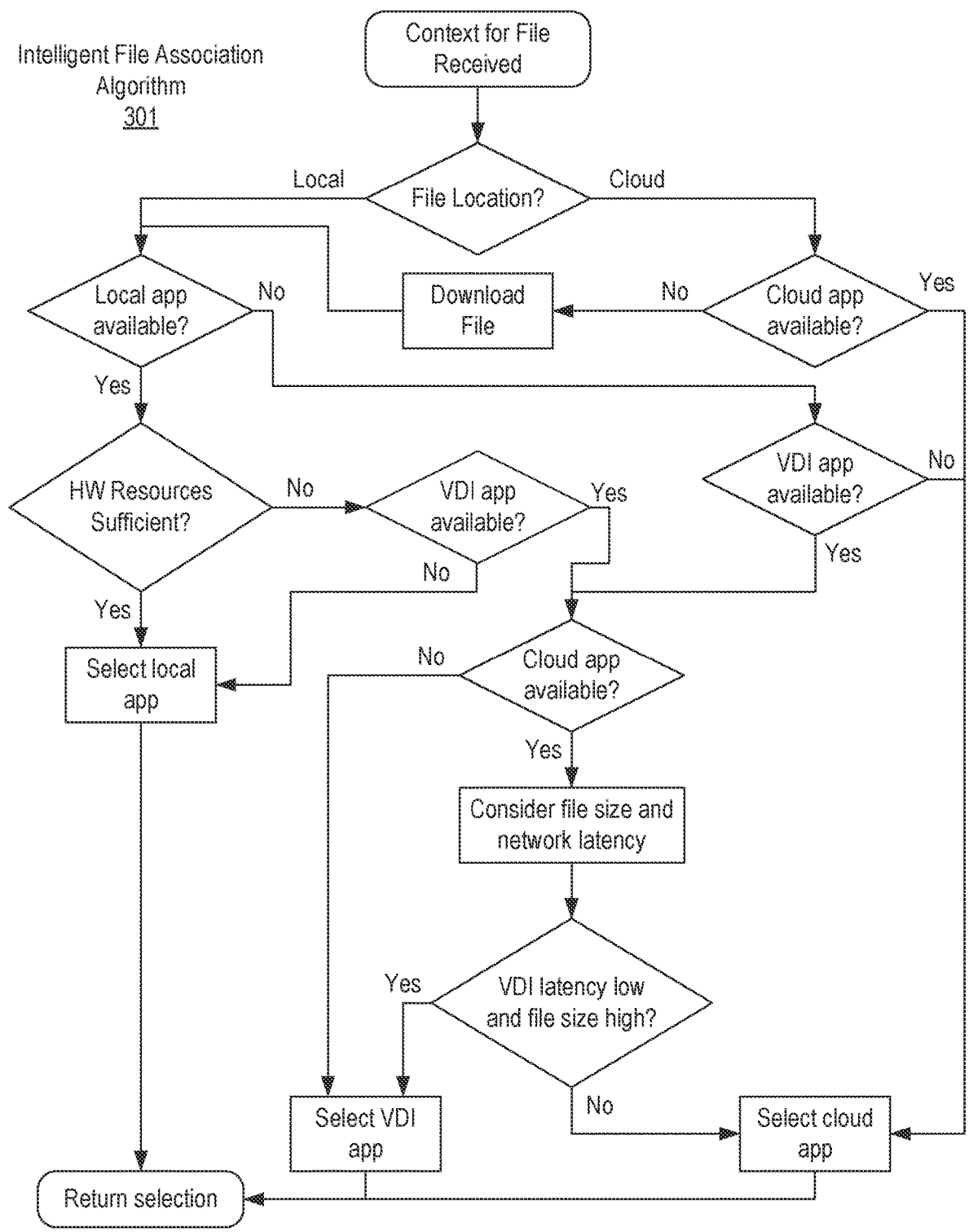
FIG. 4 provides an example of an intelligent file association algorithm that may be used in one or more embodiments of the present invention.

FIG. 4 provides an example of how intelligent file association algorithm 301 can intelligently select a local, cloud, or VDI application for a file based on context. When context for a file to be opened is received, intelligent file association algorithm 301 can determine whether the file is stored locally or in the cloud.

If the file is stored locally, a local application is available, and hardware resources are currently sufficient, the local application can be selected to be associated with the file.

If the file is stored locally, a local application is available, hardware resources are currently insufficient, and a VDI application is not available, the local application can be selected to be associated with the file.

If the file is stored locally, a local application is not available, and a VDI application is not available, a cloud application, assuming one is available, can be selected to be associated with the file.

If the file is stored locally, a local application is not available, a VDI application is available, and a cloud application is not available, the VDI application can be selected to be associated with the file.

If the file is stored locally, a local application is not available, a VDI application is available, and a cloud application is available, intelligent file association algorithm 301 can consider the file size and network latency for the VDI application and for the cloud application. If the VDI latency is low and the file size is high, the VDI application can be selected to be associated with the file, otherwise, the cloud application can be selected to be associated with the file. In other embodiments, different statuses of the network latencies and file size could be considered. For example, if the file size is not large, intelligent file association algorithm 301 may select the VDI application or the cloud application based on the respective network latencies.

If the file is stored in the cloud and a cloud application is available, the cloud application can be selected to be associated with the file.

If the file is stored in the cloud and a cloud application is not available (e.g., due to network issues or geographic restrictions), the file can be downloaded, and then intelligent file association algorithm 301 can evaluate the scenario as described above for a locally stored file.

In some embodiments, there may be multiple cloud applications available for a particular file. In such cases, the cloud location of the file may be considered by intelligent file association algorithm 301. For example, if Word in Microsoft 365 and Google Docs are available and the file is stored in cloud storage, intelligent file association algorithm 301 may select the cloud application on the same cloud platform (e.g., Word in Microsoft 365 when the file is stored on OneDrive or Google Docs when the file is stored on Google Drive).

In some embodiments, intelligent file association algorithm 301 could consider user behavior as context for selecting an application for a file. For example, if the user manually opens File1.docx in cloud Word 420a even when local Word 110a is available and would otherwise be selected, intelligent file association algorithm 301 may cache an intelligent file association to cause File1.docx to be opened in Word 420a.

In some embodiments, intelligent file association algorithm 301 may select an application based also on the cost of storing the file in cloud storage 430 and/or the amount of available free space in cloud storage 430. For example, when a file could be opened in local Word 110a, VDI Word 410a, or cloud Word 420a, intelligent file association algorithm 301 could determine that the cost of storing the file in cloud storage 430 may exceed a threshold or that available space in cloud storage 430 has fallen below a threshold and may therefore select local Word 110a and specify that the file should be stored in local storage 150. Similarly, if available local storage 150 has fallen below a threshold, intelligent file association algorithm 301 may select VDI word 410a or cloud Word 420a and cause the file to be stored in cloud storage 430 (which could include local cloud storage used for the VDI).

As mentioned above, the selection of an application to be associated with a file can be cached, whether by intelligent file association agent 140 and/or by intelligent file association engine 300. This cached intelligent file association can be retained until the relevant context is changed after which intelligent file association algorithm 301 can be provided the new/updated context to again select an application to be associated with the file.

Figure 5:
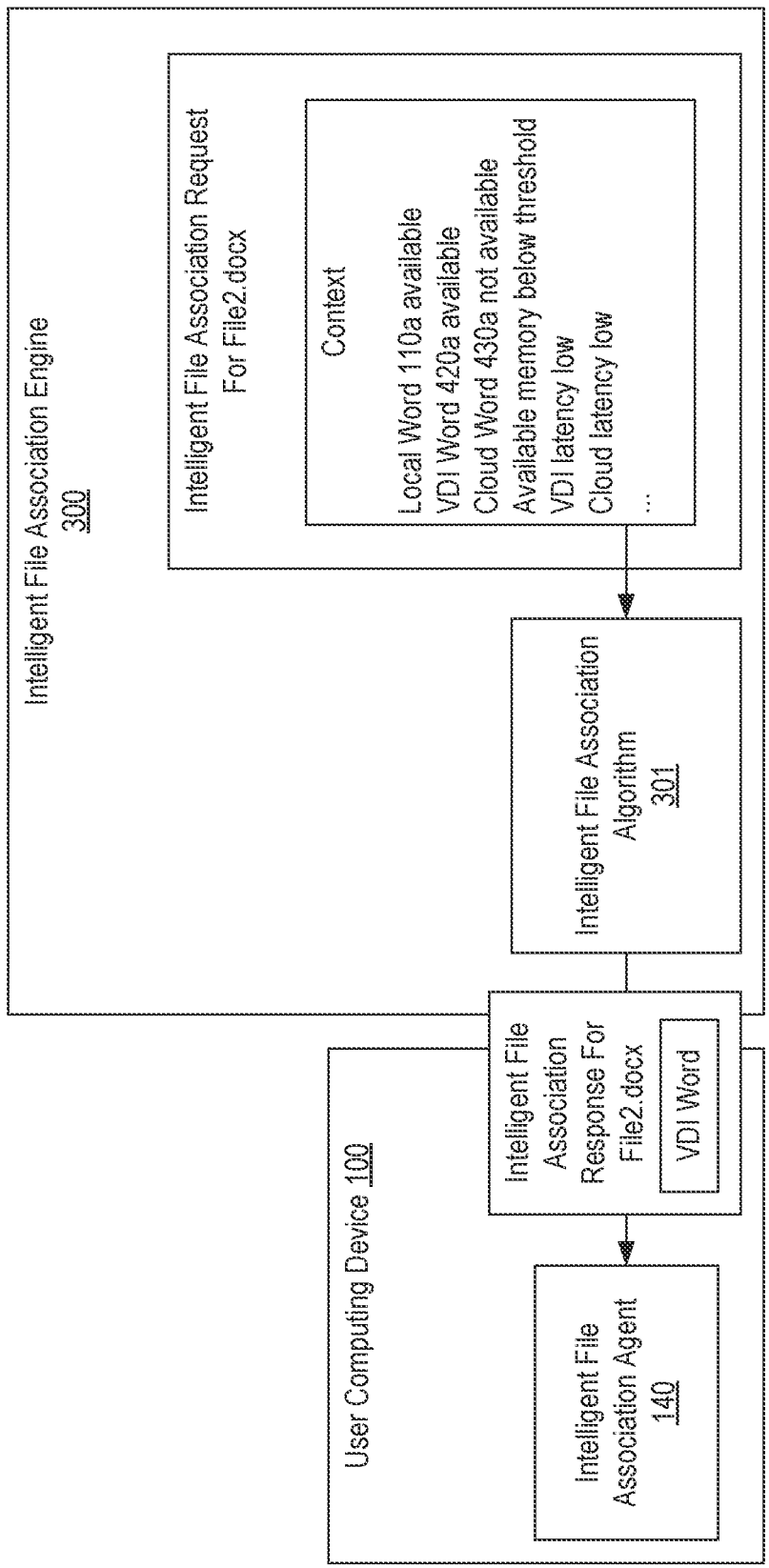
FIG. 5 provides another example of how a file may be intelligently associated with an application in accordance with one or more embodiments of the present invention.

FIG. 5 provides another example of how a file can be intelligently associated with an application in accordance with embodiments of the present invention. In this example, it is assumed that the user is attempting to open File2.docx and that the depicted context exists. In this scenario, intelligent file association algorithm 301 may select VDI word 420a based on the context defining that cloud Word 430a is not available and that, although local Word 110a is available, the available memory on user computing device 100 is below a threshold.

Figure 6:
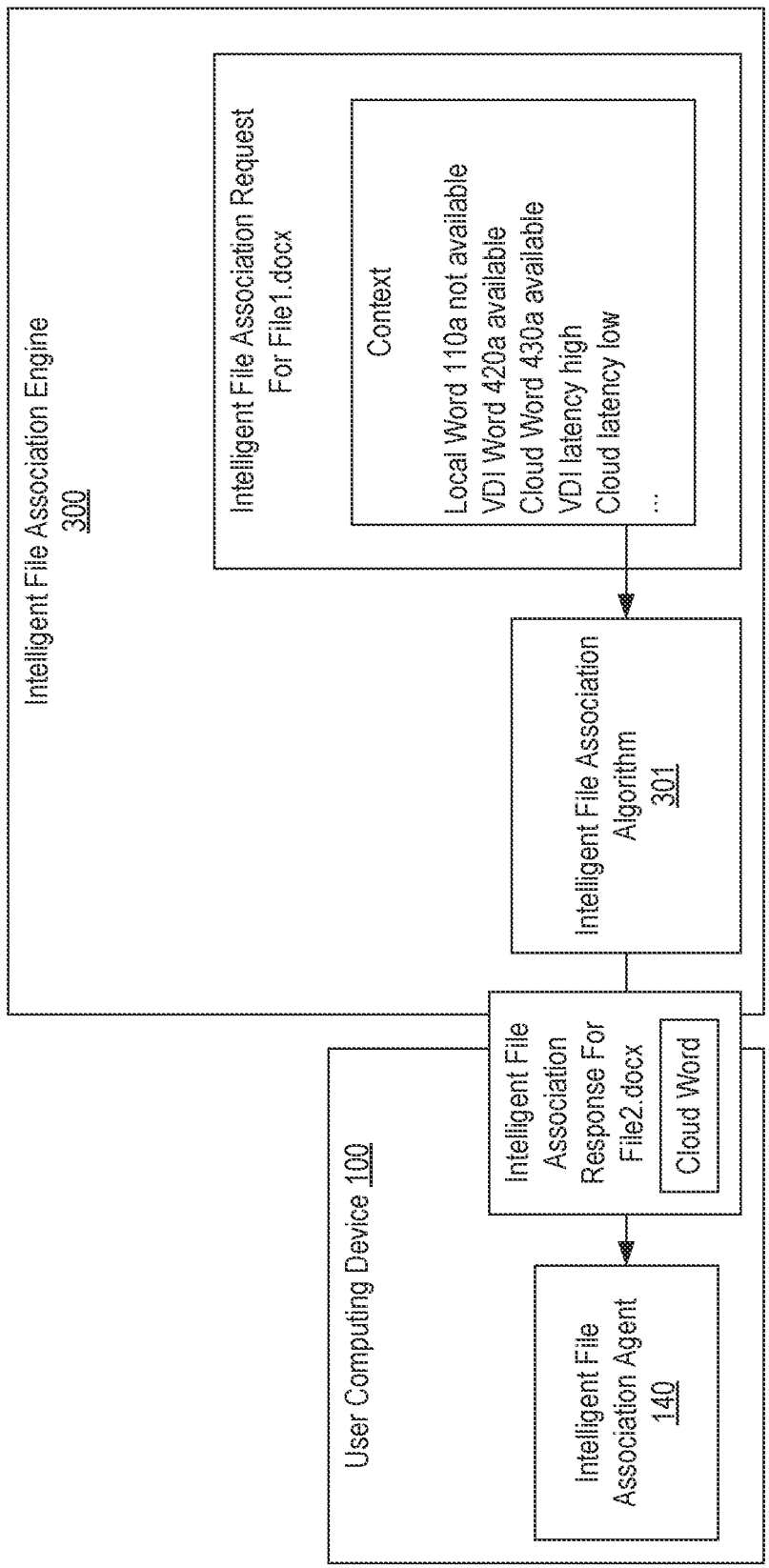
FIG. 6 provides another example of how a file may be intelligently associated with an application in accordance with one or more embodiments of the present invention.

FIG. 6 provides another example of how a file can be intelligently associated with an application in accordance with embodiments of the present invention. In this example, it is assumed that the user is attempting to open File1.docx and that the depicted context exists. In this scenario, intelligent file association algorithm 301 may select cloud word 430a based on the context defining that local Word 110a is not available and that the VDI network latency is high while the cloud network latency is low.

In summary, a file can be intelligently and dynamically associated with a local application, a VDI application, or a cloud application based on context that exists when the user is attempting to open the file. As a result, the user can be given an enhanced user experience without needing to manually select an application each time a file is to be opened.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for intelligently associating a file with an application, the method comprising:
    receiving, at an intelligent file association engine, context for a file that can be opened in multiple different applications on a user computing device, the multiple different applications including a local application, a virtual desktop infrastructure (VDI) application, and a cloud application;
    determining, from the context, that the file is stored in a cloud;
    determining, from the context, that the cloud application is not currently available to open the file;
    in response to determining that the cloud application is not currently available to open the file, causing the file to be downloaded to the user computing device;
    based on the context, selecting between the local application and the VDI application to open the file that has been downloaded; and
    causing the file that has been downloaded to be opened in the selected application.

2. The method of claim 1, wherein the context is received in response to a user attempting to open the file.

3. The method of claim 1, wherein the context includes network latency context.

4. The method of claim 1, wherein the context includes local resource context.

5. The method of claim 1, wherein the context includes a cost of storage.

6. The method of claim 1, further comprising:
    storing an association between the selected application and the file; and
    subsequently using the stored association to open the file with the selected application.

7. The method of claim 1, wherein the local application is selected to open the file that has been downloaded after determining that resources of the user computing device are sufficient.

8. The method of claim 1, wherein the VDI application is selected to open the file that has been downloaded after determining that resources of the user computing device are insufficient.

9. One or more computer storage media storing computer executable instructions which when executed implement a method for intelligently associating a file with an application, the method comprising:
    receiving, at an intelligent file association engine, context for a file that can be opened in multiple different applications on a user computing device, the multiple different applications including a local application, a virtual desktop infrastructure (VDI) application, and a cloud application;
    determining, from the context, that the file is stored locally;
    in response to determining that the file is stored locally, determining, from the context, that resources of the user computing device are insufficient;
    in response to determining that the resources of the user computing device are insufficient, determining that the VDI application and the cloud application are both available to open the file that is stored locally;
    determining, from the context, that a size of the file that is stored locally is high and a latency of a network by which the VDI application is accessed is low;
    in response to determining that the size of the file that is stored locally is high and the latency of the network by which the VDI application is accessed is low, selecting the cloud application to open the file that is stored locally; and
    causing the file that is stored locally to be opened in the cloud application.

10. The computer storage media of claim 9, wherein the context is received in response to a user attempting to open the file.

11. The computer storage media of claim 9, wherein the context includes network latency context.

12. The computer storage media of claim 9, wherein the context includes local resource context.

13. A system for intelligently associating a file with an application, the system comprising:
    one or more user computing devices each having an intelligent file association agent; and
    an intelligent file association engine;
    wherein the intelligent file association engine is configured to:
        receive context for a file that can be opened in multiple different applications on a user computing device, the multiple different applications including a local application, a virtual desktop infrastructure (VDI) application, and a cloud application;
        determining, from the context, that the file is stored in a cloud;
        determining, from the context, that the cloud application is not currently available to open the file;
        in response to determining that the cloud application is not currently available to open the file, causing the file to be downloaded to the user computing device;
        in conjunction with downloading the file to the user computing device, determining that resources of the user computing device are insufficient;

in response to determining that resources of the user computing device are insufficient, determining that the VDI application is not available to open the file that has been downloaded; and in response to determining that the VDI application is not available to open the file that has been downloaded, causing the file that has been downloaded to be opened in the local application.

14. The system of claim 13, wherein the context includes file context, application context, local resource context, and network latency context.

15. The computer storage media of claim 9, wherein the method further comprises:

storing an association between the cloud application and the file; and subsequently using the stored association to open the file with the cloud application.

16. The computer storage media of claim 9, wherein the method further comprises:

in conjunction with determining that the size of the file that is stored locally is high and the latency of the network by which the VDI application is accessed is low, determining that a cost of storing the file in storage used by the cloud application is less than a cost of storage used by the VDI application;

wherein the cloud application is selected to open the file that is stored locally based also on determining that the cost of storing the file in storage used by the cloud application is less than the cost of storage used by the VDI application.

17. The computer storage media of claim 9, wherein the method further comprises:

in conjunction with determining that the size of the file that is stored locally is high and the latency of the network by which the VDI application is accessed is low, determining that an amount of storage available to the cloud application exceeds a threshold;

wherein the cloud application is selected to open the file that is stored locally based also on determining that the amount of storage available to the cloud application exceeds the threshold.

* * * * *